(12) United States Patent
Hoffmann

(10) Patent No.: US 9,781,632 B2
(45) Date of Patent: Oct. 3, 2017

(54) INTERACTION AND MIGRATION OF EPC TOWARDS VIRTUALIZED MOBILE BACKHAUL/SHARING OF RAT (ENB, RNC, BSC)

(71) Applicant: NOKIA SOLUTIONS AND NETWORKS MANAGEMENT INTERNATIONAL GMBH, Munich (DE)

(72) Inventor: Klaus Hoffmann, Munich (DE)

(73) Assignee: NOKIA SOLUTIONS AND NETWORKS MANAGEMENT INTERNATIONAL GMBH, Munich (DE)

( * ) Notice: Subject to any disclaimer, the term of this patent is extended or adjusted under 35 U.S.C. 154(b) by 0 days.

(21) Appl. No.: 14/786,243

(22) PCT Filed: Apr. 22, 2013

(86) PCT No.: PCT/EP2013/058239
§ 371 (c)(1),
(2) Date: Oct. 22, 2015

(87) PCT Pub. No.: WO2014/173426
PCT Pub. Date: Oct. 30, 2014

(65) Prior Publication Data
US 2016/0088519 A1    Mar. 24, 2016

(51) Int. Cl.
*G06F 11/00*    (2006.01)
*H04L 1/00*    (2006.01)
(Continued)

(52) U.S. Cl.
CPC ........... *H04W 28/08* (2013.01); *H04L 47/125* (2013.01); *H04L 47/14* (2013.01)

(58) Field of Classification Search
CPC ....... H04W 28/08; H04L 47/125; H04L 47/14
(Continued)

(56) References Cited

U.S. PATENT DOCUMENTS 9,197,497 B2 * 11/2015 Engebretsen ....... H04L 41/0803
9,535,415 B2 *  1/2017 Keller ................ G05B 19/0428
(Continued)

FOREIGN PATENT DOCUMENTS

WO    WO 2010/066430 A1    6/2010
WO    WO 2012/055446 A1    5/2012

OTHER PUBLICATIONS

International Search Report and Written Opinion dated Jun. 21, 2013 corresponding to International Patent Application No. PCT/EP2013/058239.
(Continued)

*Primary Examiner* — Chuong T Ho
(74) *Attorney, Agent, or Firm* — Squire Patton Boggs (US) LLP

(57) ABSTRACT

Apparatuses and methods are provided by which a second network is associated to or disassociated from a network element (e.g., an eNB) which is connected to a first network, and an association configuration information is sent to the network element, the association configuration information comprising a combination of a first network identification identifying the first network and a second network identification identifying the second network. Based on this association configuration, for example load balancing using both the first and the second network may be carried out.

40 Claims, 3 Drawing Sheets

(51) Int. Cl.
H04L 12/26 (2006.01)
H04W 28/08 (2009.01)
H04L 12/803 (2013.01)
H04L 12/801 (2013.01)

(58) Field of Classification Search
USPC .... 370/229, 230.1, 231, 232, 233, 234, 235, 370/235.1, 252, 254, 236
See application file for complete search history.

(56) References Cited

U.S. PATENT DOCUMENTS

| | | | |
|---|---|---|---|
| 2003/0147408 A1 | 8/2003 | Datta et al. | |
| 2012/0303835 A1 | 11/2012 | Kempf et al. | |
| 2012/0307697 A1 | 12/2012 | Mukhopadhyay | |
| 2013/0024542 A1* | 1/2013 | Keller | G05B 19/0428 709/217 |
| 2014/0146673 A1* | 5/2014 | Parker | H04L 47/10 370/235 |
| 2014/0201338 A1* | 7/2014 | Engebretsen | H04L 49/357 709/220 |
| 2014/0228042 A1* | 8/2014 | Annan | H04W 8/26 455/452.1 |
| 2014/0233544 A1* | 8/2014 | McCann | H04W 48/18 370/338 |

OTHER PUBLICATIONS

Hideyuki Shimonishi et al., "Virtualized network infrastructure using OpenFlow," (invited paper), Network Operations and Management Symposium Workshops (NOMS WKSPS), 2010, IEEE/IFIP, Apr. 19, 2010, pp. 74-79, XP031690721.
Yong Zhu et al., "Algorithms for Assigning Substrate Network Resources to Virtual Network Components," INFOCOM 2006. 25th IEEE International Conference on Computer Communications. Proceedings, IEEE, Apr. 1, 2006, pp. 1-12, XP031072362.
ETSI TS 123 251 V10.1.0 (Mar. 2011), Technical Specification, Universal Mobile Telecommunications System (UMTS); LTE; Network sharing; Architecture and functional description (3GPP TS 23.251 version 10.1.0 Release 10), Mar. 1, 2011, XP014064751, 28 pages.
Roland Bless et al., "Network Virtualization from a Signaling Perspective," Future-Net '09 International Workshop on the Network of the Future 2009 in conjunction with IEEE ICC 2009; Dresden, Jun. 16-18, 2009, 6 pages.
Panagiotis Papadimitriou et al., "Implementing Network Virtualization for a Future Internet," 20th ITC Specialist Seminar, May 18-20, 2009, Hoi An, Vietnam, 8 pages.
S. Yasukawa, "Signaling Requirements for Point-to-Multipoint Traffic-Engineered MPLS Label Switched Paths (LSPs)," Network Working Group, IETF, RFC 4461, Apr. 2006, pp. 1-30.
A. Farrel et al., "A Path Computation Element (PCE)—Based Architecture," Network Working Group, IETF, RFC 4655, Aug. 2006, pp. 1-40.
J. Ash et al., "Path Computation Element (PCE) Communication Protocol Generic Requirements," Network Working Group, IETF, RFC 4657, Sep. 2006, pp. 1-21.
T. Li et al., "IS-IS Extensions for Traffic Engineering," Network Working Group, IETF, RFC 5305, Oct. 2008, pp. 1-17.
A. Doria et al., "Forwarding and Control Element Separation (ForCES) Protocol Specification," Internet Engineering Task Force (IETF), RFC 5810, Mar. 2010, 124 pages.

* cited by examiner

INTERACTION AND MIGRATION OF EPC TOWARDS VIRTUALIZED MOBILE BACKHAUL/SHARING OF RAT (ENB, RNC, BSC)

FIELD OF THE INVENTION

The present invention relates to network virtualization, in particular in connection with migration of a packet network such as EPC towards a virtualized mobile backhaul/sharing of radio access technology (RAT), which may include network control elements such as a eNB, a radio network controller (RNC) and a base station controller (BSC).

RELATED BACKGROUND ART

Prior art which is related to the technical field of network virtualization can e.g. be found in "Network Virtualization from a Signaling Perspective" by Roland Bless and Christoph Werle, Future-Net '09 International Workshop on the Network of the Future 2009 in conjunction with IEEE ICC 2009, Dresden, Jun. 16-18, 2009, "Implementing Network Virtualization for a Future Internet" by P. Papadimitriou, O. Maennel, A. Greenhalgh, A. Feldmann, and L. Mathy, 20th ITC Specialist Seminar on Network Virtualization, Hoi An, Vietnam, May 2008, as well as Request For Comments (RFC) Nos. 4461, 4655, 4657, 5305, 5810 issued by the IETF.

The following meanings for the abbreviations used in this specification apply:
ATCA—Telecommunications Computing Architecture
BSC—base station controller
CSP—communication service provider
eNB—evolved Node B
EPC—evolved packet core
Forces—forwarding and control element separation
GMPLS—generalized multi-protocol label switching
IP—Internet protocol
KPI—key performance indicator
MME—mobility management entity
MO—mobile operator
MOCN—multi-operator core network
NE—network element
NVO—Network Virtualization Overlays
PCE—path computation element
PGW—packet data gateway
PGW-C—packet data gateway control plane
PGW-U—packet data gateway user plane
PIP/InP—physical infrastructure provider/infrastructure provider
PLMN—public land mobile network
PLMN-ID—PLMN identification
RNC—radio network controller
SGW—signaling gateway
SGW-C—signaling gateway control plane
SGW-U—signaling gateway user plane
SNMP—simple network management protocol
UE—user equipment
VLAN—virtual local area network
VNO—virtual network operator
VNP—virtual network provider
VNet-ID—virtual network identification
VNode-ID—virtual Node Identification)
Vif—Virtual interface (Vif)

In the last years, an increasing extension of communication networks, e.g. of wire based communication networks, such as the Integrated Services Digital Network (ISDN), broadband networks, and especially the Internet and other packet based networks based e.g. on the Internet Protocol (IP), Ethernet, MPLS/GMPLS (Multiprotocol Label Switching/Generalized Multiprotocol Label Switching) or related technologies and preferably using optical transmission based on SDH/SONET (Synchronous Digital Hierarchy/Synchronous Optical Networking) and/or WDM/DWDM (Wavelength Division Multiplexing/Dense Wavelength Division Multiplexing), or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN) or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Recent technology progress deals with network virtualization, which splits the conventional monolithically owned, used and operated networks into subsets to be used, operated and managed by different, organizationally independent control entities or organizations. Basically, network virtualization is a concept to create logical network resources, e.g. virtual nodes and virtual links, which form a virtual network, from physical resources.

The use of network virtualization promises additional flexibility and offers opportunities for deploying future network architectures. That is, network virtualization enables for the creation of logically isolated network partitions over a shared physical network infrastructure, wherein the network virtualization can be driven by the needs in, for example, an enterprise domain. Furthermore, network virtualization covers network elements and protocols that together maintain a coherent end-to-end view of a virtual network.

Basically, network virtualization is considered in 3 main sections:
Network elements (NEs): how is traffic separation and isolation of different virtual networks maintained internal to a network element for the data part and the control part;
Data path: how is traffic separation enforced across a network path;
Control plane: what extensions to protocols are needed to control and manage partitioned resources (access to NEs and between NEs).

Considerations regarding network virtualization are made, for example, in connection with several projects, for example 4WARD (European-Union funded) and G-Lab (German national funded). Results of such projects introduced, for example, a separation into different roles regarding network virtualization, i.e. a Virtual Network Operator, VNO, role or level, a Virtual Network Provider, VNP, role or level, and a Physical Infrastructure Provider or just Infrastructure Provider, PIP/InP, role or level.

PIP/InP are infrastructure providers, e.g. large companies that own the infrastructure required to enable communication between different locations and which provide end users with access to their networks. Infrastructure providers may also enable the creation of virtual nodes and virtual links on top of and using their own physical resources and provide them to another party.

VNP is a provider which represents an intermediate party between a VNO and the infrastructure providers. The VNP is capable and equipped, for example, to compose and provide a virtual network slice as requested by a VNO from physical resources of one or more infrastructure providers. The VNO, on the other hand, can install and instantiate a network architecture using the virtual network slice and properly configure it. After the virtual network has been set up, end users may attach to it and use the service it provides. A VNO may provide a service in the virtual network by itself or allow other service providers to offer their services, e.g., an IP-TV service, inside the virtual network.

That is, the VNP is supposed to request and collect virtual resources from a PIP/InP, and to form a whole virtualized network on behalf of a VNO, which in turn operates this virtual network. In that way, the physical resources of a PIP/InP are separated and transformed into virtual resources provided to and managed by a VNP, and configured to form virtual networks finally handed over to VNOs for operation and use. In that way also the control of such virtual resources, even if implemented as shares of the same physical entities, is completely handed over to the virtual network operator using it.

Thus, with the event of virtualisation it is possible to assign virtual networks, as described in WO 2012/055446 A1 ("Dynamic Creation of Virtualized Network Topology"), for example.

However, when migrating from legacy networks such as EPC towards virtualized EPC, it is not always feasible and possible to virtualize all elements in the radio access network such as the E-UTRAN. This problem applies in particular for an eNB, but also for similar elements such as a radio network controller (RNC) and a base station controller (BSC).

Document US 2012/0303835 describe an implementation of a control plane of an EPC in a cloud computing system. That is, e.g., the control part of the S-GW (S-GW-C) is implemented in the cloud. In case of overload on the virtual EPC control entities, a new virtual machine (VM) is started in the cloud. However, UE's and eNB do not have control plane entities in the cloud, wherein according to this document it is assumed that the eNB acts as an OpenFlow GTP-extended gateway.

Hence, this document describes a case in which an eNB is statically assigned to a virtual network.

However, during migration from legacy EPC towards virtualized EPC, it is desirable to be able to use both the legacy EPC and the virtualized EPC in a flexible way.

SUMMARY OF THE INVENTION

Embodiments of the present invention address this situation and aim to overcome the above-described problem and to provide a method, apparatus, and computer program product by means of which a flexible use of both physical networks (such as a legacy EPC) and virtual networks (such as a virtualized EPC) can be used flexibly.

According to a first aspect of the present invention a method is provided which comprises associating or disassociating a second network to a network element which is connected to a first network, and sending an association configuration information to the network element, the association configuration information comprising a combination of a first network identification identifying the first network and a second network identification identifying the second network According to a second aspect of the present invention a method is provided which comprises receiving, in a network element, association configuration information, the association configuration information comprising a combination of a first network identification identifying a first network connected to the network element and a second network identification identifying a second network associated to the network element, and configuring the network element to operate based on the association configuration information.

According to a third aspect of the present invention a method is provided which comprises receiving a session request from or for a user equipment by a network element, selecting a first network, detecting whether there is an association between the selected first network and a second network based on association configuration information, the association configuration information comprising a combination of a first network identification identifying the first network connected to a network element carrying out the method and a second network identification identifying a second network associated to the network element, and, if there is an association, performing load balancing by distributing traffic for the user session on the first network and the second network.

According to a fourth aspect of the present invention an apparatus is provided which comprises a memory, at least one network interface, and a processor configured to associate or disassociate a second network to a network element which is connected to a first network, and to send an association configuration information to the network element, the association configuration information comprising a combination of a first network identification identifying the first network and a second network identification identifying the second network.

According to a fifth aspect of the present invention an apparatus is provided which comprises a memory, at least one network interface, and a processor configured to receive association configuration information, the association configuration information comprising a combination of a first network identification identifying a first network connected to the apparatus and a second network identification identifying a second network associated to the apparatus, and to operate based on the association configuration information.

According to a sixth aspect of the present invention an apparatus is provided which comprises a memory, at least one network interface, and a processor configured to receive a session request from or for a user equipment, to select a first network, to detect whether there is an association between the selected first network and a second network based on association configuration information, the association configuration information comprising a combination of a first network identification identifying the first network connected to the apparatus and a second network identification identifying a second network associated to the apparatus, and, if there is an association, to perform load balancing by distributing traffic for the user session on the first network and the second network.

Modifications of the first to sixth aspects are defined in the dependent claims.

Moreover, according to a seventh aspect of the present invention, a computer program product is provided which comprises code means for performing a method according to any one of the first and second aspects and their modifications when run on a processing means or module. The computer program product may be embodied on a computer-readable medium.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

As mentioned above, in future migration from conventional EPC to virtual EPC and backhaul architecture is heavily needed.

Therefore, especially during a transition time, EPCs might be implemented as conventional networks and as virtual networks side by side. According to embodiments of the present invention, a flexible use of this arrangement is achieved, namely by dynamically associating a virtual network (such as the virtualized EPC) to a physical network (such as the conventional (legacy) EPC).

Figure 1:
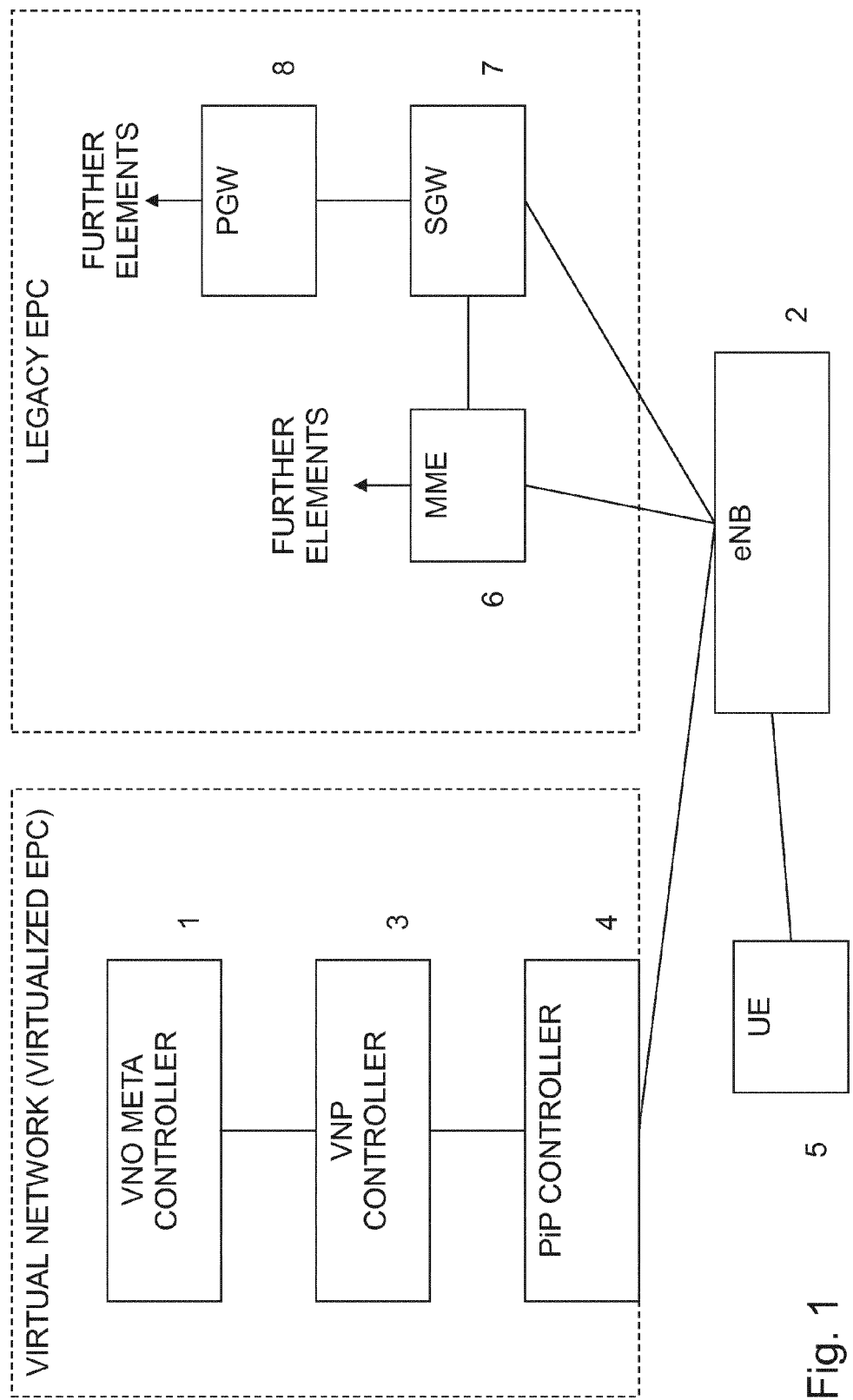
FIG. 1 shows an arrangement of a legacy EPC and a virtualized EPC according to an embodiments of the present invention.

FIG. 1 shows an arrangement, in which a virtual network and a legacy EPC (as an example for a physical network) are illustrated. The legacy EPC comprises, among others, a MME 6, a SGW 7 and a PGW 8. As indicated, the elements 6 to 8 may also be connected to further elements in the EPC.

In the virtual network, controllers of the three levels (VNO, VNP and PiP/InP) are shown, namely a VNO meta controller 1, a VNP controller 3 and a PiP controller 4. It is noted that in practice, some of the levels could be combined (e.g., VNO and VNP level, or VNP and PiP level), so that also the corresponding controllers could be provided as a combination.

Moreover, as shown in FIG. 1, an eNB 2 is connected to the legacy EPC (i.e., to the MME 6 and the SGW 7), and a UE is connectable to the eNB.

Figure 2:
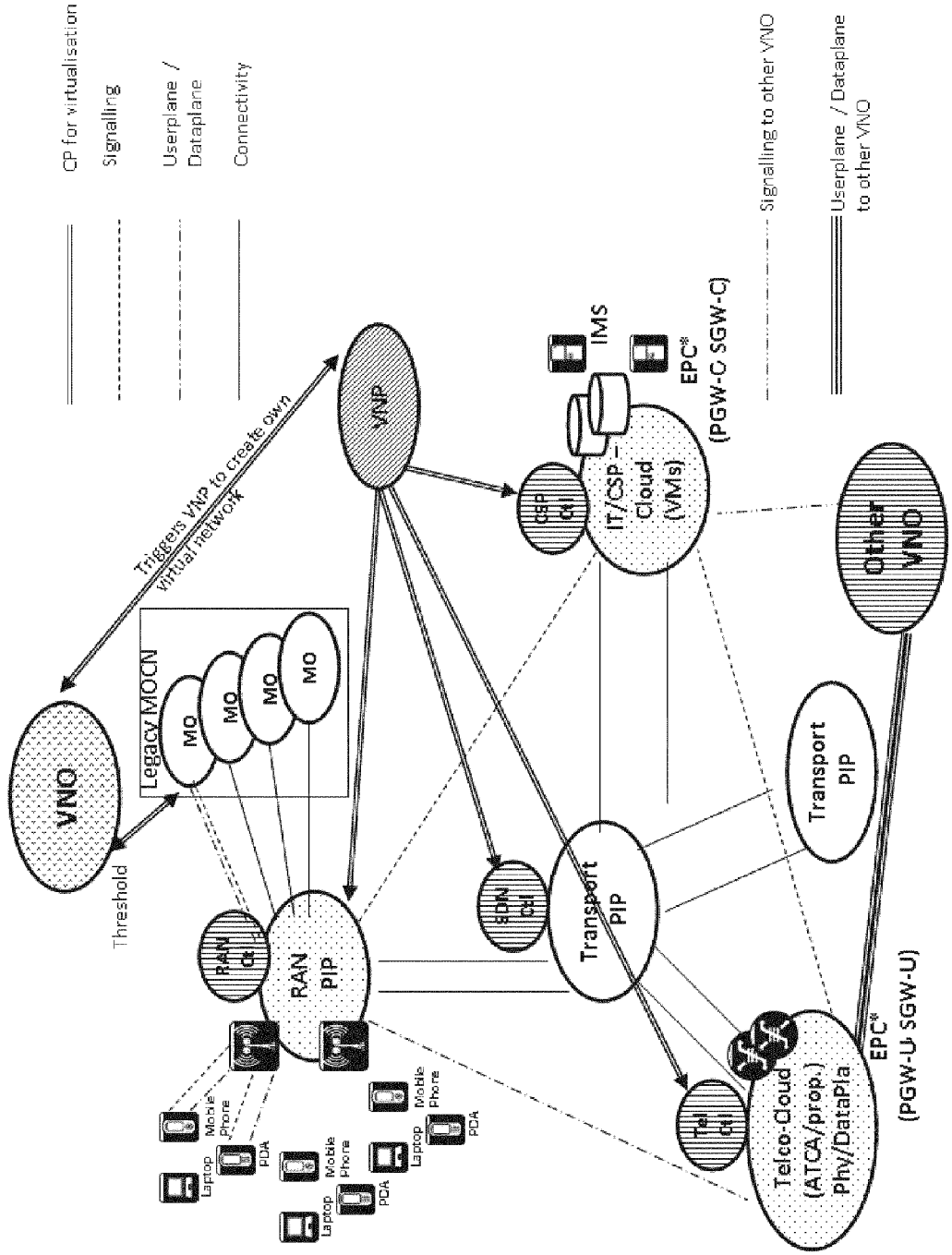
FIG. 2 shows an arrangement of virtual networks in connection with a conventional mobile network according to an embodiment of the present invention.

In the virtual network, an EPC can be virtualized, in which the corresponding elements (such as MME, SGW, PGW) of the EPC are virtualized. For example, PGW/SGW-U (User part of the PGW/SGW) could be virtualized at a telco ATCA cloud, MME and PGW/SGW-C (control part) could be virtualized at a CSP/IT cloud, as shown in FIG. 2 described later.

In particular in case of an overload in the legacy EPC, according to the present embodiment of the invention, the virtualized EPC is assigned to the eNB. Hence, load balancing can be performed between the virtual network and the physical network.

The association between the virtual network and the physical network is signaled to the eNB by forwarding a corresponding association configuration information.

This can be realized, for example, by sending a combination of PLMN-ID (as an example for a physical network identification) and a VLAN (or VNet-ID or MPLS label) from the VNO meta controller 1 (via the VNP controller 3) to the eNB. In this way, the legacy (today hard coded/preconfigured) association/configuration between the PLMN-ID and the (hardcoded/preconfigured) VLAN (or MPLS label, or whatever is suitable) can be overcome. With this information, the eNB can connect the control part and the user part to the virtualized EPC, in particular to the transport PiP. The transport PIP in turn delivers the payload (here both the control and user plane parts) to the corresponding MME and/or SGW-U respectively.

The VNO Meta controller 1 directs the eNB 2 how to load balance between multiple mobile backhaul LANs (not shown in FIG. 1) and the corresponding virtual EPC and/or the possibly existing legacy hardware hosting the normal EPC.

Furthermore, the VNO meta controller 1 may dynamically start/stop eNB traffic towards legacy EPC and/or virtual EPC.

According to an embodiment of the present invention, the VNO meta controller 1 may supervise a threshold indicating the load on the legacy and/or virtual EPC, and instruct the eNB to perform the load balancing for its parts. For example, the VNO meta controller 1 may monitor a KPI (key performance indicator) of the legacy and/or virtual EPC as the threshold described above.

Based on this threshold (KPI), the VNO meta controller sets load balance parameters, and sends these load balance parameters to the eNB. Based on these load balance parameters, the eNB may then distribute the traffic between the legacy EPC and the virtual EPC.

Thus, according to embodiments of the present invention, the eNB is not virtualized, since a virtualization of the eNB may possible be not feasible and/or to expensive. Therefore, network sharing as described above (sharing of a physical and a virtual network) is more feasible to realize and involves less costs.

When the above association between eNB (virtualized or not) on one side and legacy EPC and virtual EPC one the other side, has been established, user session handling is performed as follows. In particular, when the UE 5 requests a session (or a session to the UE is requested), the UE 5 and/or eNB 2 (or, alternatively default legacy or virtualised MME) selects PLMN ID, and the eNB checks whether for this PLMN-ID several VLAN had been provided by the VNO meta controller 1. If this is the case, the eNB 2 forwards based on the load balance parameter the User signalling and payload into the corresponding VLAN, VNet-ID or MPLS label (i.e., the virtual network). However, for this user the correlation is kept fixed for the lifetime of the User session.

A more detailed and practical arrangement is illustrated in FIG. 2, which shows creation of virtual LTE triggered by threshold in conventional mobile network. Several examples for UEs are shown (laptops, mobile phones, PDAs etc.), which are connected to a radio access network (RAN). Signaling and user plane connections are provided to a legacy EPC, which is indicated in FIG. 2 as a legacy multi-operator core network (MOCN), in which several mobile operators (MO) may be located. A VNO (the VNO meta controller 1 shown in FIG. 1) monitors a threshold indicating a load on the EPC. When the threshold is exceeded, this triggers the VNP (the VNP controller 3 shown in FIG. 1) to create an own virtual network.

As shown, several virtual networks, i.e., several clouds are present, such as an IT cloud, a Telco Cloud or an IT/CSP cloud, in all of which virtualized EPCs may be located.

As can be seen from FIG. 2, a virtualized EPC is indicated as EPC*. In this example, the virtualized EPC* consists of virtualized MME, PGW- and SGW-control plane parts, which are located in the IT/CSP cloud VMs. The user plane parts of the PGW/SGW are located in the Telco cloud/ATCA cloud. The controllers (VNO meta controller, VNP controller and/or PiP controller shown in FIG. 1) are needed to set up and request the corresponding resources at the ATCA and the CSP cloud and the RAN (irrespective of whether being in a cloud or not) and the transport PIP to ensure connectivity among them via the transport PIP. The VNO meta controller gets information from the legacy MO (threshold etc) and requests resources from the VNP.

However, the above structure for the virtualized EPC* is only an example. That is, the virtualized EPC* could probably consist only in a first step of integrated PGW, SGW and MME and in a second step of the virtualized MME, PGW- and SGW-control plane parts, and do not necessarily have to be located in IT/CSP cloud VMs. Also the user plane parts of the PGW/SGW could be located in other clouds than the Telco cloud/ATCA cloud or dedicated physical servers.

In the following, some further embodiments of the present invention are described.

For example, in order to avoid abuse, a secure communication between the eNB 2 and the VNO meta controller 1 may be established.

Furthermore, a consistency check between eNB and local PIP (e.g., between the eNB 2 and the PiP controller 4 shown in FIG. 1) can be performed, in order to ensure that there is no breach/abuse/DoS attack, by exchange of an additional security token between the participating roles (eNB 2 and PiP controller 4 in the example of FIG. 1).

One possibility to dynamically change the virtual network association could be to use an amended OpenFlow protocol, such that e.g. additionally to the for instance already existing VLAN tag the PLMN-ID is added to indicate the correlation of the virtual network with the corresponding PLMN of the EPC. Alternatively any other token such as the MPLS label may be assigned to the PLMN-ID.

Also ForcEs may be used instead of OpenFLow to signal the assignment.

In general, a new information element (IE) can be provided, in which a virtual network identification (such as VLAN, MPLS label, VNet-ID etc.) and the physical network identification (such as the PLMN-ID) are correlated. This new information element may then be forwarded from the VNO controller 1 to the eNB 2 in OpenFlow or Forces or any other similar control protocol.

Furthermore, any other protocol like GMPLS or NVO may be used for the signalling of the correlation. Even an augmented SNMP may be utilized correlating PLMN-ID and MPLS label, VLAN ID etc.

Moreover, the association of the virtual network to the network element (such as the eNB) may also be canceled. In this case, the association configuration information described above may include the virtual network identification and the physical network identification, and furthermore include an information that the virtual network is disassociated. That is, for further user sessions, the virtual network is no longer to be used. However, ongoing user sessions may still be continued by using the hitherto valid configuration, e.g., by using the legacy EPC and the virtualized EPC.

Figure 3:
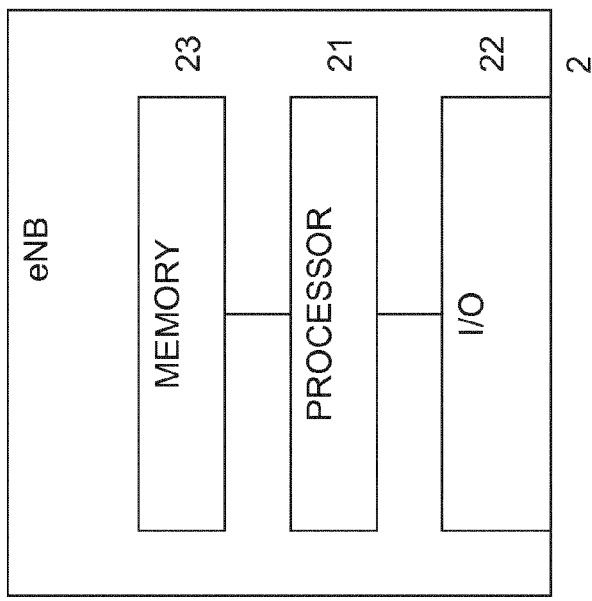
FIG. 3 shows a block circuit diagram illustrating configurations of a control elements in which examples of embodiments of the invention are implementable.
Figure 3:
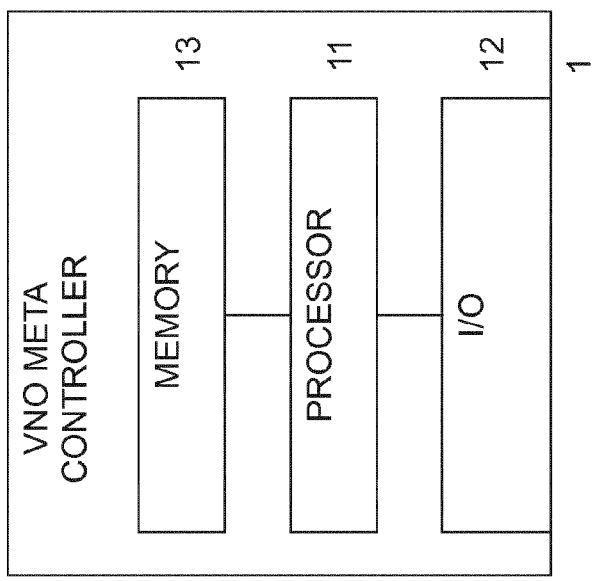

In the following, a general embodiment of the present invention is described by referring to FIG. 3. In particular, FIG. 3 shows several elements involved in procedures according to embodiments of the present invention. In more detail, FIG. 3. shows the VNO meta controller 1 (as an example for a controller on/above the VNO level because it has views into the different networks (legacy/virtualized) simultaneously), and the eNB 2 as an example for a network element. It is noted that the network element in general could be a physical network element (such as the eNB), or also a virtual network element.

It is to be noted that the elements 1 and 2 shown in FIG. 3. may comprise several further elements or functions besides those described in connection therewith but which are omitted herein for the sake of simplicity as they are not essential for understanding the invention.

The VNO controller 1 comprises a processing function or processor 11, such as a CPU or the like, which executes instructions given by programs or the like related to the reliability and availability setting control. The processor 11 may comprise further portions dedicated to specific processings as described below. Portions for executing such specific processings may be also provided as discrete elements or within one or more further processors, for example. Reference sign 12 denotes transceivers or input/output (I/O) units connected to the processor 11. The I/O units 12 may be used for communicating with other network elements or functions, such as other hierarchical levels like the PIP/InP level or the VNP level. Reference sign 13 denotes a memory usable, for example, for storing data and programs to be executed by the processor 11 and/or as a working storage of the processor 11.

The processor 11 is configured to perform the following: associating or disassociating a second network to a network element (e.g, eNB 2) which is connected to a first network, and sending an association configuration information to the network element, the association configuration information comprising a combination of a first network identification identifying the first network and a second network identification identifying the second network.

Similar as the control element 1, the eNB 2 comprises a processing function or processor 21, such as a CPU or the like, which executes instructions given by programs or the like related to the reliability and availability setting control. The processor 21 may comprise further portions dedicated to specific processings as described below. Portions for executing such specific processings may be also provided as discrete elements or within one or more further processors, for example. Reference sign 22 denotes transceivers or input/output (I/O) units connected to the processor 21. The I/O units 22 may be used for communicating with other network elements (e.g., the PiP controller 4, the UE 5, the MME 6 and the SGW 8 shown in FIG. 1). Reference sign 23 denotes a memory usable, for example, for storing data and programs to be executed by the processor 21 and/or as a working storage of the processor 21.

The processor 21 is configured to perform the following: receiving association configuration information, the association configuration information comprising a combination of a first network identification identifying a first network and a second network identification identifying a second network associated to the network, and configuring the network element to operate based on the association configuration information.

The operation based on the association configuration information described above may comprise performing load balancing using the first network and the second network, for example.

The processor 21 may further or alternatively configured to perform the following: receiving a session request from or for a user equipment, selecting a first network,
  detecting whether there is an association between the selected first network and a second network based on association configuration information, and, if there is an association, performing load balancing by distributing traffic for the user session on the first network and the second network.

The association configuration information may comprise an indication that the second network is associated to or disassociated from the network element. Such an indication may be an explicit information included in an information element (IE), but alternatively such that if, e.g., the association configuration information including the first and second network identifications is signalled, then it is clear that the both networks are associated to the network element, and/or that in case no such information element is sent in a message from the VNO meta controller 1 (or a similar element) to the network element (e.g., eNB 2), than it is clear that the association is cancelled, i.e, that the second network is disassociated from the network element.

Moreover, the first network may be a physical or virtual network, and the network element is a physical network element connected to the physical network, and/or the second network is a virtual network.

The association configuration information may be sent by a protocol, such as a network protocol or a virtual network protocol, for example OpenFlow, GMPLS, Forces, NVO, SNMP etc.

It is noted that the embodiments and the present invention in general is not limited to the specific examples given above.

For example, in the embodiments described above in connection with FIGS. 1 to 3, the eNB 2 was described as an example for a network element. However, also other elements are possible, such as a radio network controller (RNC) and a base station controller (BSC). That is, the embodiments of the present invention may be applied to any kind of network elements.

Moreover, in the embodiments described above, the VNO meta controller 1 was described as controller which configures the association and/or disassociation of the second network to the network element. However, this is only an example, and other controllers are possible, for a example also a VNP controller.

Additionally, the VNO meta controller (of the VNO, as shown in FIG. 2) may configure (or may request to configure) the PIPs (and/or PIP controllers) of the Telco Cloud, CSP Cloud and the Transport PIP via the VNP controller or bypassing the VNP controller to associate the particular e.g. VLAN (similar to way the eNB was configured to the PLMN ID) with the corresponding PLMN-ID.

Moreover, the embodiments are in particular advantageous for a case in which a physical network element cannot easily be virtualized, such as the eNB described above. However, the embodiments are equally applicable to virtual networks, and may be in general applicable to network elements, to which besides a legacy network also a virtual network can be assigned. That is, the network element may also be a virtualized radio network controller (RNC) or a virtualized base station controller (BSC), and even SGW/PGW etc, for example.

Thus, according to some embodiments of the present invention, apparatuses and methods are provided by which a second network is associated to or disassociated from a network element (e.g., an eNB) which is connected to a first network, and an association configuration information is sent to the network element, the association configuration information comprising a combination of a first network identification identifying the first network and a second network identification identifying the second network. Based on this association configuration, for example load balancing using both the first and the second network may be carried out.

According to a further aspect of embodiments of the present invention, an apparatus is provided which comprises
  means for associating or disassociating a second network to a network element which is connected to a first network, and
  means for sending an association configuration information to the network element, the association configuration information comprising a combination of a first network identification identifying the first network and a second network identification identifying the second network.

According to a another aspect of embodiments of the present invention, an apparatus is provided which comprises
  means for receiving association configuration information, the association configuration information comprising a combination of a first network identification identifying a first network connected to the apparatus and a second network identification identifying a second network associated to the apparatus, and
  means for operating based on the association configuration information.

According to a still further aspect of embodiments of the present invention, an apparatus is provided which comprises
  means for receiving a session request from or for a user equipment,
  means for selecting a first network,
  means for detecting whether there is an association between the selected first network and a second network based on association configuration information, the association configuration information comprising a combination of a first network identification identifying the first network connected to the apparatus and a second network identification identifying a second network associated to the apparatus, and,
  means for performing, if there is an association, load balancing by distributing traffic for the user session on the first network and the second network.

It is to be understood that any of the above modifications can be applied singly or in combination to the respective aspects and/or embodiments to which they refer, unless they are explicitly stated as excluding alternatives.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element (station) may be any device, apparatus, unit or means by which a system user or subscriber may experience services from an access network, such as a mobile phone or smart phone, a personal digital assistant PDA, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. A method comprising
receiving, in a network element, association configuration information, the association configuration information comprising a combination of a first network identification identifying a first network connected to the network element and a second network identification identifying a second network and an indication that the second network is associated to or disassociated from the network element;
configuring the network element to operate based on the association configuration information;
receiving a session request from or for a user equipment;
selecting the first network;
detecting whether there is an association between the selected first network and the second network based on the received association configuration information; and
if there is an association, performing load balancing by distributing traffic for the user session on the first network and the second network.

2. The method according to claim 1, further comprising
receiving a load balance parameter, and
performing the load balancing based on the received load balance parameter.

3. The method according to claim 1, wherein the association configuration information is included in an information element.

4. The method according to claim 1, wherein the association configuration information is sent by a protocol.

5. The method according to claim 1, further comprising
maintaining the load balancing for the lifetime of the user session.

6. The method according to claim 1, further comprising
receiving an association configuration information indicating that the second network is disassociated from the network element;
using only the first network for a new user session request; and
maintaining the load balancing for existing user sessions requested before receiving the association configuration information indicating that the second network is disassociated from the network element.

7. The method according to claim 1, wherein a connection of the network element with the second network is provided via a physical infrastructure provider and/or a virtual network provider.

8. The method according to claim 7, further comprising checking consistency between the network element and the physical infrastructure provider and/or virtual network provider.

9. The method according to claim 8, wherein the consistency check is performed by exchanging a security token.

10. The method according to claim 1, wherein the first network is a physical or a virtual network, and the network element is a physical network element connected to the first network, and/or the second network is a virtual network.

11. A computer program product embodied on a non-transitory computer-readable medium, said computer program product comprising code that performs the method according to claim 1 when run on a processor.

12. A method comprising
receiving a session request from or for a user equipment by a network element,
selecting a first network,
detecting whether there is an association between the selected first network and a second network based on association configuration information, the association configuration information comprising a combination of a first network identification identifying the first network connected to a network element carrying out the method and a second network identification identifying a second network associated to the network element, and,
if there is an association, performing load balancing by distributing traffic for the user session on the first network and the second network.

13. The method according to claim 12, further comprising
receiving a load balancing parameter and
performing load balancing based on the received load balance parameter.

14. The method according to claim 13, further comprising maintaining the load balancing for the lifetime of the user session.

15. The method according to claim 12, further comprising
receiving an association configuration information indicating that the second network is disassociated from the network element,
using only the first network for a new user session request, and
maintaining the load balancing for existing user sessions requested before receiving the association configuration information indicating that the second network is disassociated from the network element.

16. The method according to claim 12, wherein a connection of the network element with the second network is provided via a physical infrastructure provider and/or a virtual network provider.

17. The method according to claim 16, further comprising checking consistency between the network element and the physical infrastructure provider and/or a virtual network provider.

18. The method according to claim 17, wherein the consistency check is performed by exchanging a security token.

19. The method according to claim 12, further comprising receiving the association configuration information from a virtual network controller by a protocol.

20. The method according to claim 12, wherein the first network is a physical network, and the network element is a physical network element connected to the physical network, and/or the second network is a virtual network.

21. A computer program product embodied on a non-transitory computer-readable medium, said computer program product comprising code that performs the method according to claim 12 when run on a processor.

22. An apparatus comprising
a memory,
at least one network interface, and
a processor configured
to receive association configuration information, the association configuration information comprising a combination of a first network identification identifying a first network connected to the apparatus and a second network identification identifying a second network and an indication that the second network is associated to or disassociated from the apparatus;
to operate based on the association configuration information;
to receive a session request from or for a user equipment;
to select a first network;
to detect whether there is an association between the selected first network and a second network based on the received association configuration information; and
if there is an association, to perform load balancing by distributing traffic for the user session on the first network and the second network.

23. The apparatus according to claim 22, wherein the processor is configured to
receive a load balance parameter; and
to perform the load balancing based on the received load balance parameter.

24. The apparatus according to claim 22, wherein the association configuration information is included in an information element.

25. The apparatus according to claim 22, wherein the association configuration information is sent by a protocol.

26. The apparatus according to claim 22, wherein the processor is configured to maintain the load balancing for the lifetime of the user session.

27. The apparatus according to claim 22, wherein the processor is configured
to receive an association configuration information indicating that the second network is disassociated from the apparatus;
to use only the first network for a new user session request; and
to maintain the load balancing for existing user sessions requested before receiving the association configuration information indicating that the second network is disassociated from the apparatus.

28. The apparatus according to claim 22, wherein a connection of the apparatus with the second network is provided via a physical infrastructure provider and/or a virtual network provider.

29. The apparatus according to claim 28, wherein the processor is configured to check consistency between the apparatus and the physical infrastructure provider and/or virtual network provider.

30. The apparatus according to claim 29, wherein the processor is configured to perform the consistency check by exchanging a security token.

31. The apparatus according to claim 22, wherein the first network is a physical or a virtual network, and the apparatus is a physical network element connected to the first network, and/or the second network is a virtual network.

32. An apparatus comprising
a memory,
at least one network interface, and
a processor configured
to receive a session request from or for a user equipment,
to select a first network,
to detect whether there is an association between the selected first network and a second network based on association configuration information, the association configuration information comprising a combination of a first network identification identifying the first network connected to the apparatus and a second network identification identifying a second network associated to the apparatus, and,
if there is an association, to perform load balancing by distributing traffic for the user session on the first network and the second network.

33. The apparatus according to claim 32, wherein the processor is configured
to receive a load balancing parameter and
to perform load balancing based on the received load balance parameter.

34. The apparatus according to claim 33, wherein the processor is configured to
maintain the load balancing for the lifetime of the user session.

35. The apparatus according to claim 32, wherein the processor is configured to
receive an association configuration information indicating that the second network is disassociated from the apparatus,
to use only the first network for a new user session request, and
to maintain the load balancing for existing user sessions requested before receiving the association configuration information indicating that the second network is disassociated from the apparatus.

36. The apparatus according to claim 32, wherein a connection of the apparatus with the second network is provided via a physical infrastructure provider and/or a virtual network provider.

37. The apparatus according to claim 36, wherein the processor is configured to check consistency between the network element and the physical infrastructure provider and/or a virtual network provider.

38. The apparatus according to claim 37, wherein the processor is configured to perform the consistency check by exchanging a security token.

39. The apparatus according to claim 32, wherein the processor is configured to receive the association configuration information from a virtual network controller by a protocol.

40. The apparatus according to claim 32, wherein the first network is a physical network, and the apparatus is a physical network element connected to the physical network, and/or the second network is a virtual network.

\* \* \* \* \*